(12) United States Patent
Sasaki et al.

(10) Patent No.: US 6,819,644 B2
(45) Date of Patent: Nov. 16, 2004

(54) OPTICAL DISC RECORDING METHOD AND APPARATUS

(75) Inventors: Takashi Sasaki, Kanagawa (JP); Atsushi Mori, Tokyo (JP); Munetoshi Moriichi, Kanagawa (JP); Mitsuyuki Bamba, Saitama (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 09/881,676

(22) Filed: Jun. 18, 2001

(65) Prior Publication Data

US 2002/0021642 A1 Feb. 21, 2002

(30) Foreign Application Priority Data

Jun. 19, 2000 (JP) ........................................ 2000-183780

(51) Int. Cl.[7] ............................................ G11B 7/0045
(52) U.S. Cl. ..................................... 369/59.12; 369/116
(58) Field of Search ........................... 369/59.11, 275.4, 369/116, 59.12

(56) References Cited

U.S. PATENT DOCUMENTS

| | | | | |
|---|---|---|---|---|
| 4,731,773 A | * | 3/1988 | Lewkowicz | 369/59.11 |
| 4,894,816 A | * | 1/1990 | Sukeda et al. | 369/53.31 |
| 5,218,591 A | * | 6/1993 | Shimamoto et al. | 369/53.31 |
| 5,233,589 A | * | 8/1993 | Saito et al. | 369/47.34 |
| 5,297,129 A | * | 3/1994 | Wilkinson et al. | 369/59.12 |
| 5,469,422 A | * | 11/1995 | Sohmuta | 369/59.11 |
| 5,490,126 A | * | 2/1996 | Furumiya et al. | 369/59.12 |
| 5,825,742 A | * | 10/1998 | Tanaka et al. | 369/59.11 |
| 5,974,021 A | * | 10/1999 | Toda et al. | 369/116 |
| 6,160,784 A | * | 12/2000 | Maeda et al. | 369/116 |
| 6,222,815 B1 | * | 4/2001 | Nagano | 369/47.51 |
| 6,442,119 B1 | * | 8/2002 | Sunagawa | 369/47.53 |
| 6,480,450 B1 | * | 11/2002 | Fujii et al. | 369/59.12 |
| 6,504,806 B1 | * | 1/2003 | Nakajo | 369/59.12 |
| 2002/0089914 A1 | * | 7/2002 | Nakajo | 369/59.12 |

FOREIGN PATENT DOCUMENTS

| | | | | |
|---|---|---|---|---|
| EP | 0 388 897 | | 9/1990 | |
| EP | 0 932 144 | | 7/1999 | |
| EP | 1 117 094 | | 7/2001 | |
| JP | 01119921 A | * | 5/1989 | ............ G11B/7/00 |
| JP | 4-209318 | | 7/1992 | |
| JP | 06274889 A | * | 9/1994 | ............ G11B/7/00 |
| JP | 10-124950 | | 5/1998 | |
| JP | 11-102522 | | 4/1999 | |

* cited by examiner

*Primary Examiner*—Hoa T. Nguyen
*Assistant Examiner*—Peter Vincent Agustin
(74) *Attorney, Agent, or Firm*—Oblon, Spivak, McClelland, Maier & Neustadt, P.C.

(57) ABSTRACT

A method for recording on a write-once type optical disc. A laser light beam excited to light emission by a recording pulse having a pulse width corresponding to the length of a pit formed, with the recording power of substantially the leading end of the pulse being stepped over plural stages, is illuminated on a write-once type optical disc for recording. This enables recording with an optimal pit shape at a speed faster than a quadrupled speed, such as at an octupled speed or a duo-deca-tupled speed.

14 Claims, 19 Drawing Sheets

FIG.2A EFM SIGNAL

FIG.2B EQEFM SIGNAL

FIG.16A LASER OUTPUT
FIG.16B TRACK
FIG.16C ODP_End
FIG.16D ODP_First
FIG.16E EQEFM

OPTICAL DISC RECORDING METHOD AND APPARATUS

BACKGROUND OF THE INVENTION

1. Field of the Invention

This invention relates to an optical disc recording method apparatus of a mark length recording system in which the laser light is illuminated on a recording surface of an optical disc to form pits for information recording. More particularly, it relates to a method and apparatus for recording an optical disc in which recording is made at a speed higher than a quadrupled speed, such as octupled or duodeca-tupled speed.

2. Description of Related Art

Up to now, in recording the information on a recording medium, such as an optical disc, in accordance with an optical modulation system, thermal control is exercised by pulsed light emission of the laser in order to form pits (marks) optimally on a disc. Specifically, the pulse waveform is set as a driving pulse for driving the laser, while the level (wave crest value) during each pulse period is also controlled to control the laser power and the laser illuminating period.

For example, in an optical recording and/or reproducing apparatus, typified by a CD-R (CD-Recordable) or CD-RW (CD-Re Writable), a pulse length controlling system or a pulse train recording system is used, in which the pulse length or the number of pulses of the laser light illuminated is varied depending on the recording mark length or space length to be recorded to control the laser power outputting domain.

The Orange-Book Part 2 (version 3.1), as the latest standard of CD-R, is premised, as the standard per se, on the mono-tupled speed, double-speed and quadrupled speed recording. The laser light emission control related to the write speed, that is recording strategy (recording compensation) is prescribed as shown in FIGS. 1 and 2. That is, in the CD-R standard, the information is recorded on an optical disc by the combination of pits (marks) and lands (spaces) of 3T to 11T. For the recording strategy for mono-tupled speed and double-speed recording, the laser power outputting domain of $(n-\theta)T+\alpha T$ is prescribed, where $\theta=1T$ and $\alpha=0.13T$, with the laser power forming nT pits (marks) being Pw, as shown in FIG. 1. For the recording strategy for quadrupled speed recording, $(n-\theta)T$ and ODT are prescribed as being output domains of the laser power Pw and the laser power $\Delta P$, respectively, with the laser power forming nT pits (marks) being Pw+$\Delta P$, where $\Delta P$ is 20 to 30% of Pw and ODT is set to 1.25T to 1.5T. It is noted that the mono-tupled speed herein means a speed of 1.2 to 1.4 m/s with the disc being run in rotation at a constant linear velocity (CLV).

Meanwhile, if the recording strategy prescribed by the above-mentioned Orange Book standard, premised on the mono-tupled speed recording, double speed recording and on the quadrupled speed recording, is to be applied to recording at a speed higher than the quadrupled speed, such as octupled speed recording or duodeca-tupled speed recording, thermal interference occurs between the pit and land codes to be recorded, with the result that recording signals are deteriorated in signal quality due to deformed pit shape or to increased jitter.

That is, the ideal relation between recording data and pits is such that, for recording data with a length equal to nT, a pit with a length equal to nT is formed to an oblong shape, as shown in FIG. 3. If now the octupled speed recording, for example, is to be made with the recording strategy for mono-tupled speed recording and double speed recording, a tear-shaped pit is formed in which the trailing end side of the pit is spread in a direction perpendicular to the track center, as shown in FIG. 4. If the recording strategy for quadrupled speed recording is used, there is again formed a tear-shaped pit which is only slightly improved over the case of the octupled speed recording as to spreading of the pit in the direction perpendicular to the track center, as shown in FIG. 5.

In FIGS. 4 and 5, the time periods A and B denote time delay as from the turning on of the laser emission until start of the pit forming process. On the other hand, the time periods a, b and c denote time delay as from the turning off of the laser light emission until termination of the pit forming process.

If the recording signal is deteriorated in quality due to deformed pit shape or increased jitter, there is a risk that regular reproduction cannot be realized.

SUMMARY OF THE INVENTION

It is therefore an object of the present invention to provide an optical disc recording method and apparatus whereby pits can be formed to an optimal shape at a speed faster than the quadrupled speed, such as an octupled speed or duodeca-tupled speed.

In one aspect, the present invention provides an optical disc recording apparatus including recording pulse generating means for setting a recording power at approximately the leading end portion of a recording pulse in steps of a plurality of stages and for generating a recording pulse of a pulse width corresponding to a length of a pit to be formed, and laser means for illuminating the laser light by the recording pulse supplied to form a recording data string comprised of pits and lands defined between the lands on a recording medium, wherein the laser light emitting pulsed light by the recording pulse generated by the recording pulse generating means is illuminated on a write-once optical disc as the recording medium to effect recording.

In another aspect, the present invention provides a recording method for an optical disc including generating a recording pulse having a pulse width corresponding to a length of a pit formed, the recording pulse being so formed that a recording power at approximately the forward end thereof is stepped over plural stages and illuminating a laser light beam, excited in pulsed light by the recording pulse, on a write-once optical disc to effect recording.

In still another aspect, the present invention provides a recording apparatus for an optical recording medium including means for causing rotation of the recording medium, a controller for controlling the rotational speed of the rotating means, laser means for illuminating the laser light by drive pulses supplied to form a recording data string including a pit and lands ahead and at back of the pit on the recording medium, drive pulse generating means for generating a first pulse corresponding to recording data, a second pulse for synthesis to a leading end of the first pulse and a third pulse for synthesis to a leading end of the first pulse, and for synthesizing the first to third pulses to generate the drive pulse, and pulse generation controlling means for performing control so that the level or the pulse width of one or more of the first to third pulses generated by the drive pulse generating means is varied depending on at least one of the lengths of the pit and the land formed.

In yet another aspect, the present invention provides a recording method for forming a recording data string including generating a first pulse corresponding to recording data, a second pulse for synthesis to a leading end of the first pulse and a third pulse for synthesis to a leading end of the first pulse, as pulses the level or the pulse duration of which is varied depending on at least one of the length of the pit formed and the length of the land formed, synthesizing the first to third pulses to generate a recording pulse, and illuminating the laser light by the drive pulse to form a recording data string including pits and lands between for and aft side pits on a recording medium rotated at a pre-set speed.

According to the present invention, as described above, in which the recording pulse with a pulse width corresponding to a length of a pit formed, having a recording power at approximately the forward end thereof stepped over plural stages, is generated, and the laser light excited into pulsed light by the recording pulse is illuminated to effect recording, it becomes possible to reduce thermal interference due to inter-symbol interference between the codes, that is the pits and the lands recorded, with the result that pits/lands may be formed to an optimum shape to enable a sufficient replay margin to be produced even at a high-speed recording such as octupled speed recording. In addition, the recording quality may be improved through reduction in the recording jitter.

That is, with the present invention, recording with optimal pit shape may be achieved at a speed higher than the quadrupled speed, such as at an octupled or duodeca-tupled speed.

DESCRIPTION OF THE PREFERRED EMBODIMENTS

Figure 1:
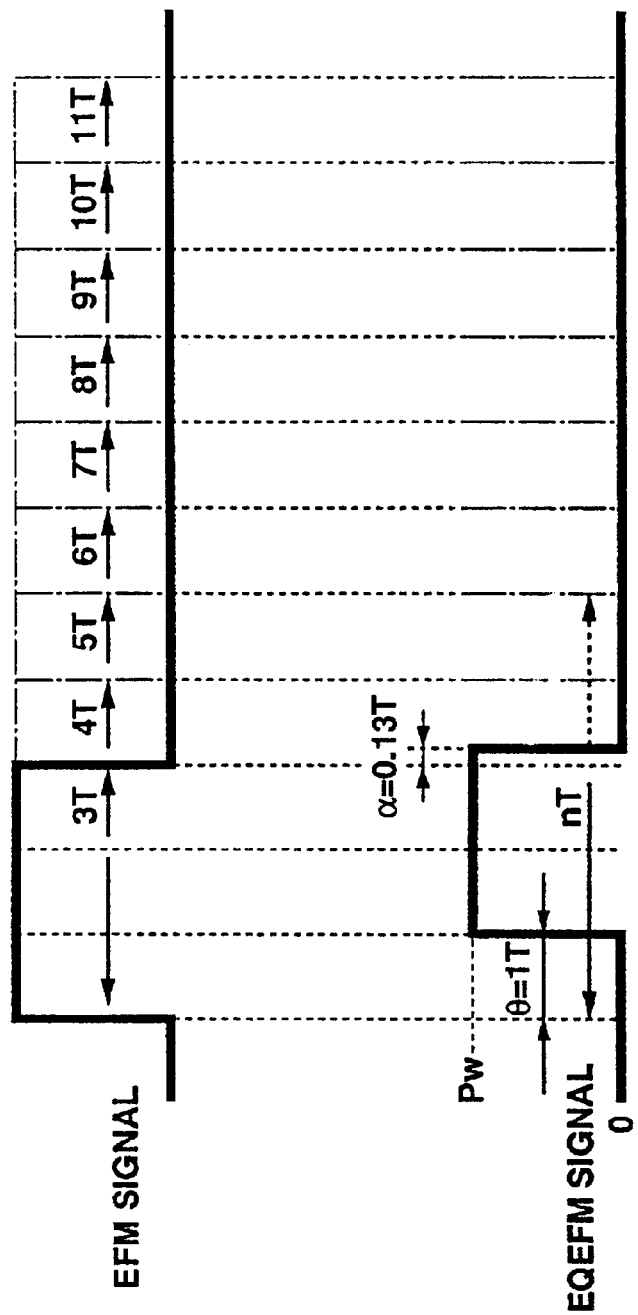
FIGS. 1A and 1B show waveform diagrams showing recording strategies in mono-tupled speed recording and double speed recording as prescribed in the Orange-Book standard.

Referring to the drawings, preferred embodiments of the present invention will be explained in detail.

Figure 6:
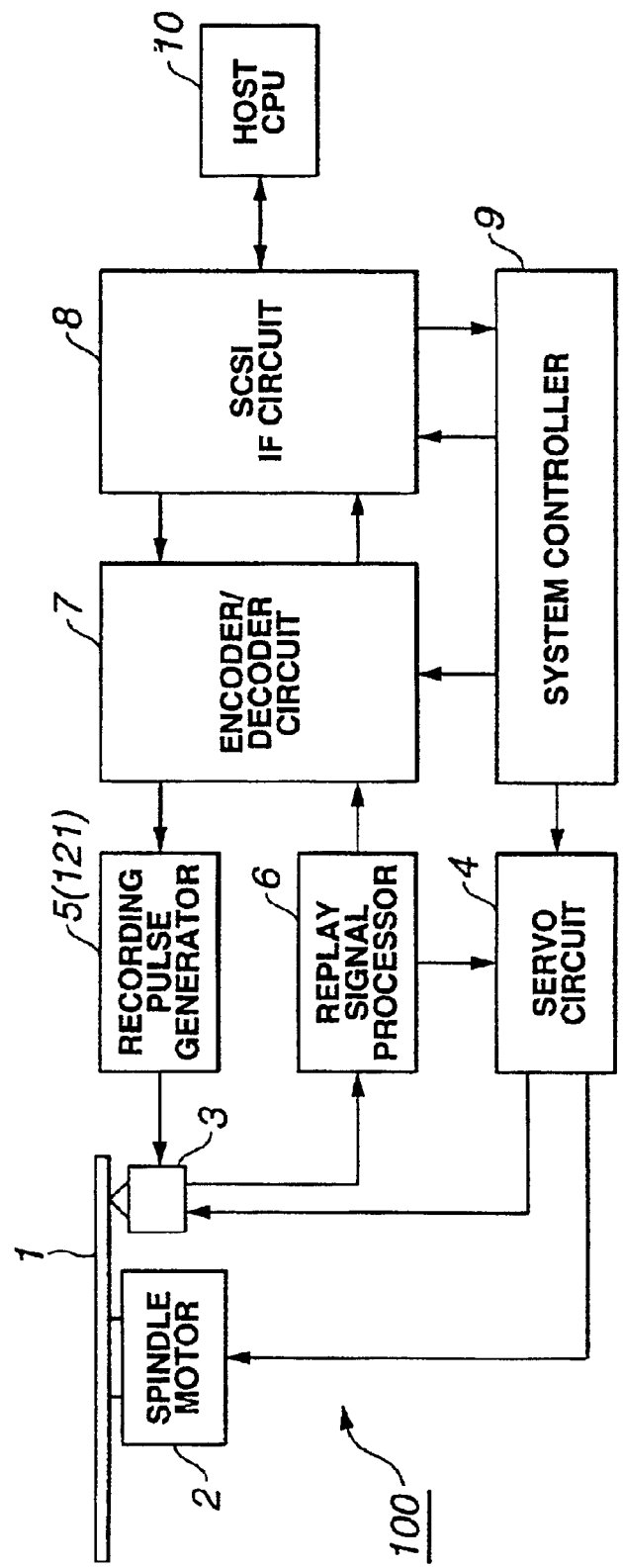
FIG. 6 is a block diagram showing a structure of an optical disc recording and/or reproducing apparatus embodying the present invention.

The present invention is applied to an optical disc recording and/or reproducing apparatus 100 configured as shown for example in FIG. 6.

The optical disc recording and/or reproducing apparatus 100, shown in FIG. 6, is a disc drive of the mark length recording system in which a CD-R (CD-Recordable), that is a write-once optical disc 1, is run in rotation at a CLV by a spindle motor 2, and in which the laser light is illuminated on the recording surface of the optical disc 1 by an optical head 3 to form pits to effect data recording and/or reproduction. The optical disc recording and/or reproducing apparatus 100 includes a servo circuit 4, connected to the spindle motor 2 and to the optical head 3, a recording pulse generating circuit 5, connected to the optical head 3, a replay signal processing circuit 6, similarly connected to the optical head 3, an encoder/decoder circuit 7, connected to the recording pulse generating circuit 5 and to the replay signal processing circuit 6, an SCSI interfacing circuit 8, connected to the encoder/decoder circuit 7, and a system controller 9 connected to the servo circuit 4, encoder/decoder circuit 7 and to the SCSI interfacing circuit 8, and is connected to an external host computer 10 through the SCSI interfacing circuit 8.

The servo circuit 4 is controlled by the host computer 10 as to a control operation conforming to a control command supplied from the host computer 10 through the SCSI interfacing circuit 8. The servo circuit 4 driving-controls the spindle motor 2 to cause the rotation of the optical disc at the CLV, so that, during data recording and/or reproduction, a target area on the recording surface of the optical disc 1 will be accessed by the optical head 3. The servo circuit 4 also controls the optical head 3 as to its feed, focusing and tracking.

In this optical disc recording and/or reproducing apparatus 100, data to be written is sent from the host computer 10 through the SCSI interfacing circuit 8 to the encoder/decoder circuit 7 where the data to be written is encoded into signals of the desired data format, for example, EFM signals, so as to be sent to the recording pulse generating circuit 5.

The recording pulse generating circuit 5 in the optical disc recording and/or reproducing apparatus 100 performs recording strategy (recording compensation) processing on the EFM (eight-to-fourteen modulated) signals, supplied from the encoder/decoder circuit 7, depending on dye materials of the recording medium, material type of the reflecting film, linear speed, or on recording speed characteristics of the optical system of the recording and/or reproducing apparatus, to generate recording pulses.

Figure 7:
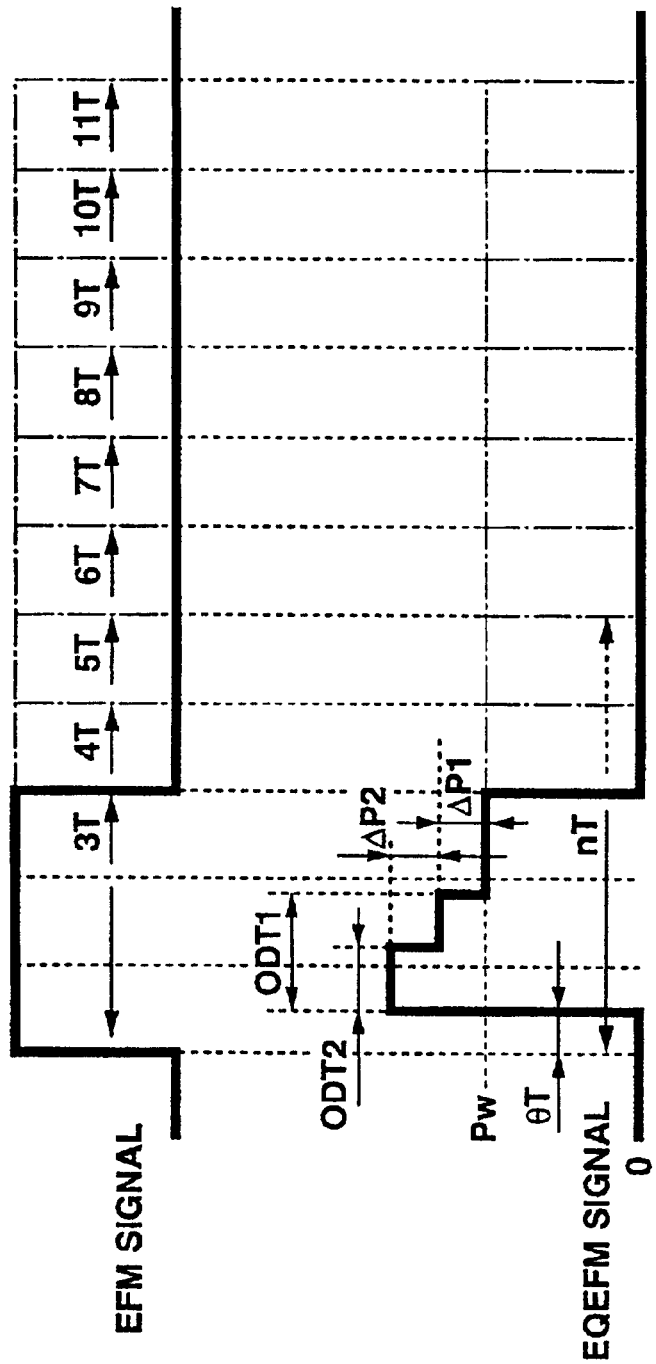
FIG. 7 is a waveform diagram showing the recording strategy as used in the optical disc recording and/or reproducing apparatus shown in FIG. 6.

FIG. 7 shows typical recording pulses generated by the recording pulse generating circuit 5.

In FIG. 7, the recording pulses ODT1 and ODT2 are variably set in the ranges of $$OT \leq ODT1 \leq 3.0T, \quad Pw*0.0 \leq \Delta P1 \leq Pw*0.5$$

$$OT \leq ODT2 \leq 3.0T, \quad Pw*0.0 \leq \Delta P2 \leq Pw*0.5$$

within a recording pulse outputting period of 3T to 11T. It is noted that ODT1, ODT2, $\Delta P1$ and $\Delta P2$ are related to one another by $$ODT1 \geq ODT2$$

$$\Delta P1 \geq \Delta P2.$$

Meanwhile, the outputting periods of the recording pulses ODT1 and ODT2 can be independently varied for each of the recording pulses 3T to 11T, if the relationship:

$$ODT1_{(3T)} \geq ODT1_{(4T)} \geq \ldots ODT1_{(11T)}$$

$$ODT2_{(3T)} \geq ODT2_{(4T)} \geq \ldots ODT2_{(11T)}$$

is maintained.

It is noted that, in recording on a recording medium, such as an optical disc, in accordance with the optical modulation recording system, the shorter the length of a land (space) lying directly ahead of the pit to be recorded, the more likely the thermal interference is produced, because the heat accumulated in recording the directly previous pit (mark) is not dissipated sufficiently. With the present recording pulse generating circuit 5, the pulse lengths of the respective pulses can be variable optionally and independently by proper combinations of the pits (marks) and lands (spaces) to be recorded, thereby varying the recording pulse length such as to optimize the replay signal following the recording.

The recording pulses, generated by the recording pulse generating circuit 5, are furnished to a laser driver circuit 30 for laser driving, enclosed in the optical head 3. The laser diode is driven by the laser driver circuit 30 in accordance with the logic of the recording pulses to cause the laser diode to emit light to record data on the optical disc 1.

Figure 8:
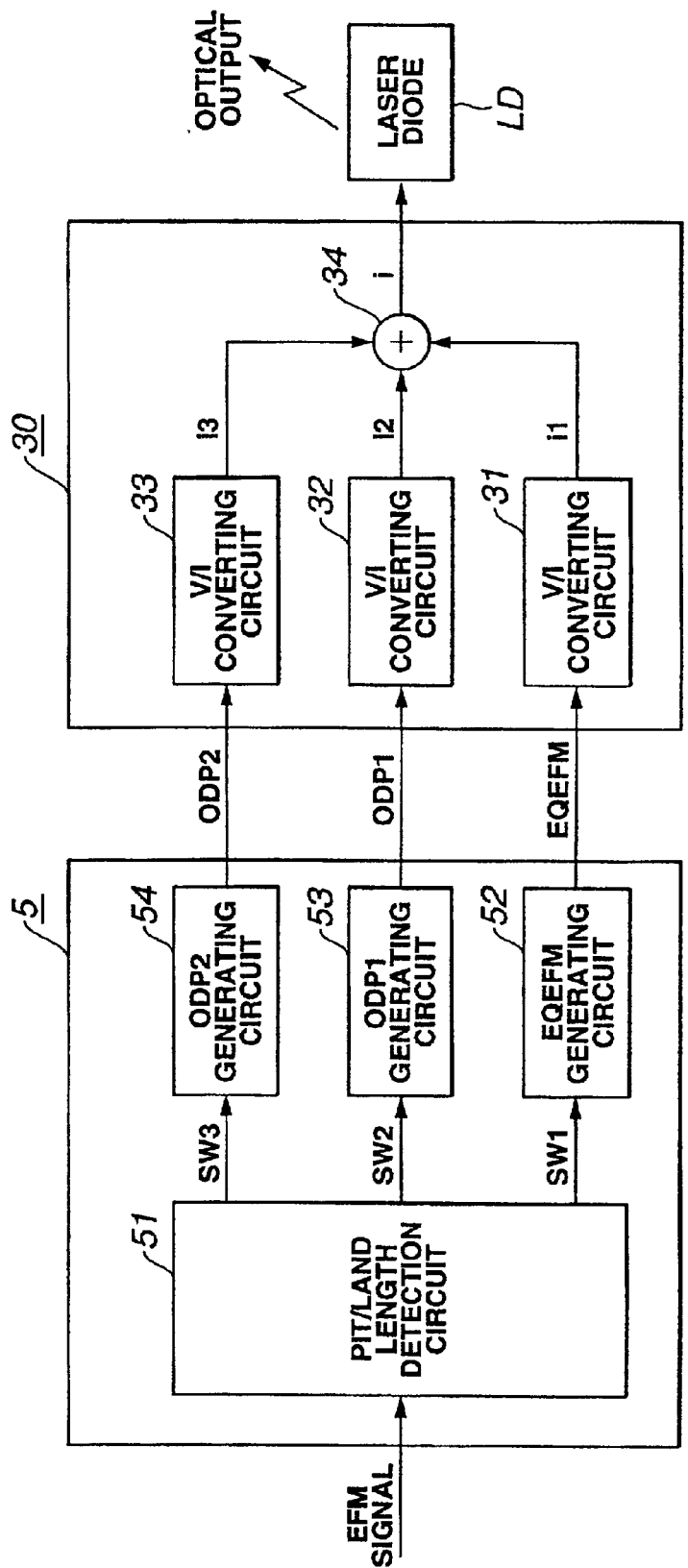
FIG. 8 is a block diagram showing a specified illustrative structure of a recording pulse generating circuit in the optical disc recording and/or reproducing apparatus shown in FIG. 6.

The recording pulse generating circuit 5 for superposing two-step stacking portions $\Delta P1$, $\Delta P2$ at approximately the leading end of an EQEFM recording pulse V1 by the recording strategy processing to generate the recording pulse V1 includes a pit/land length detection circuit 51, an EQEFM generating circuit 52, an ODP1 generating circuit 53 and an ODP2 generating circuit 54, as shown for example in FIG. 8.

In this recording pulse generating circuit 5, the pit/land length detection circuit 51 detects the pulse width of the EFM signal sent from the encoder/decoder circuit 7 and directly previous pit and land lengths. The EQEFM generating circuit 52 generates an EQEFM recording pulse V1 of a pre-set level and pulse width derived from the EFM signal, while the ODP1 generating circuit 53 generates an ODP1 recording pulse V2 to be added to approximately the leading end of the laser driving pulse and the ODP2 generating circuit 54 generates an ODP2 recording pulse V3 to be added to approximately the leading end of the laser driving pulse. The recording pulses V1, V2, V3, generated by the EQEFM generating circuit 52, ODP1 generating circuit 53 and the ODP2 generating circuit 54, respectively, are variably controlled as to the pulse widths or pulse levels (voltage levels) depending on the pulse width of the EFM signal detected by the pit/land length detection circuit 51 or on directly previous pit lengths or land lengths.

It is noted that switches SW1, SW2 and SW3 are changeover circuits for enabling/disabling the recording pulses, ODP recording pulses V2 and ODP recording pulses V3, respectively, and are controlled by the system controller 9.

That is, the system controller 9 is responsive to the write command and the mode setting command sent from the host computer 10 to recognize with which multiple speed the recording data transferred from the host computer 10 is to be recorded on the disc. The switches SW1, SW2 and SW3 are changed over responsive to the write speed as required. For example, if the write speed is mono-tupled or double speed, the switches SW2 and SW3 are turned off to disable the ODP1 generating circuit 53 and the ODP2 generating circuit 54 so that ODP recording pulses V2 or ODP recording pulses V3 are not added as the recording pulse as shown in FIG. 1. If the write speed required is the quadrupled speed, only the switch SW3 is turned off so as not to permit the ODP recording pulse V3 to be added as the recording pulse shown in FIG. 2. In recording data with the octupled speed or duo-deca-tupled speed, as in the present invention, the switches SW1, SW2 and SW3 are all turned on to permit the recording pulse shown in FIG. 7 to be output.

The recording pulses V1 to V3, generated in the recording pulse generating circuit 5, are sent to the laser driver circuit 30 enclosed in the optical head 3. The laser diode ID is driven by the laser driver circuit 30 in accordance with the logic of each recording pulse to cause the recording laser to emit light to record data on the optical disc 1. In the laser driver circuit 30, the recording pulses V1 to V3, generated by the EQEFM generating circuit 52, ODP1 generating circuit 53 and the ODP2 generating circuit 54, are converted by current/voltage converting circuits 31 to 33 into recording current signals I1 to I3, respectively, which are summed and synthesized together by an addition circuit 34 to generate a driving current i (=i1+i2+i3) which then is caused to flow through the laser diode LD to drive the laser diode LD to cause the recording laser to emit light to record data on the optical disc 1.

Figure 9:
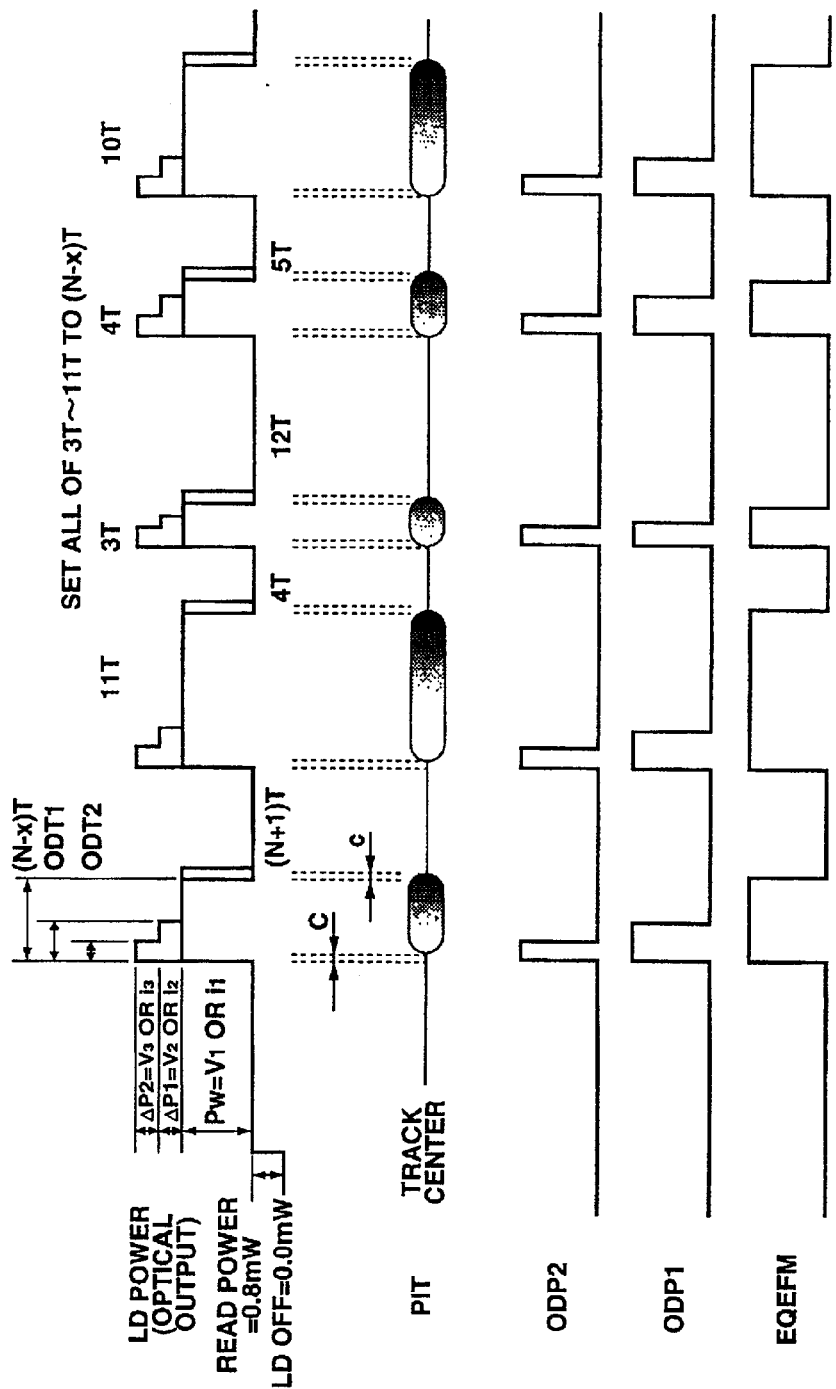
FIG. 9 is a waveform diagram showing the recording operation by the optical disc recording and/or reproducing apparatus shown in FIG. 6.

That is, in this recording pulse generating circuit 5, the driving current i, obtained on summing the recording pulses V1 to V3, generated in the recording pulse generating circuit 5, as current values, is caused to flow through the laser diode LD, and the recording laser of the light emission waveform having two-step stacked portions $\Delta P1$ and $\Delta P2$ in approximately the leading edge of the EQEFM signal is illuminated from the laser diode LD on the recording surface of the optical disc 1, as shown in FIG. 9, to form a track comprised of a pit and a land on the recording surface.

Figure 4:
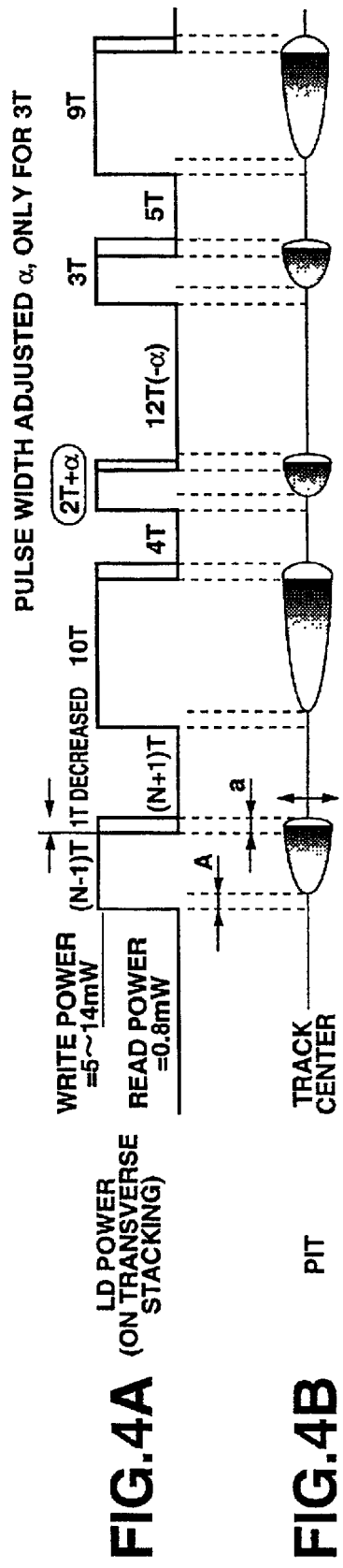
FIGS. 4A and 4B illustrate pit distortion in octupled speed recording using the recording strategies in mono-tupled speed recording and double speed recording.
Figure 5:
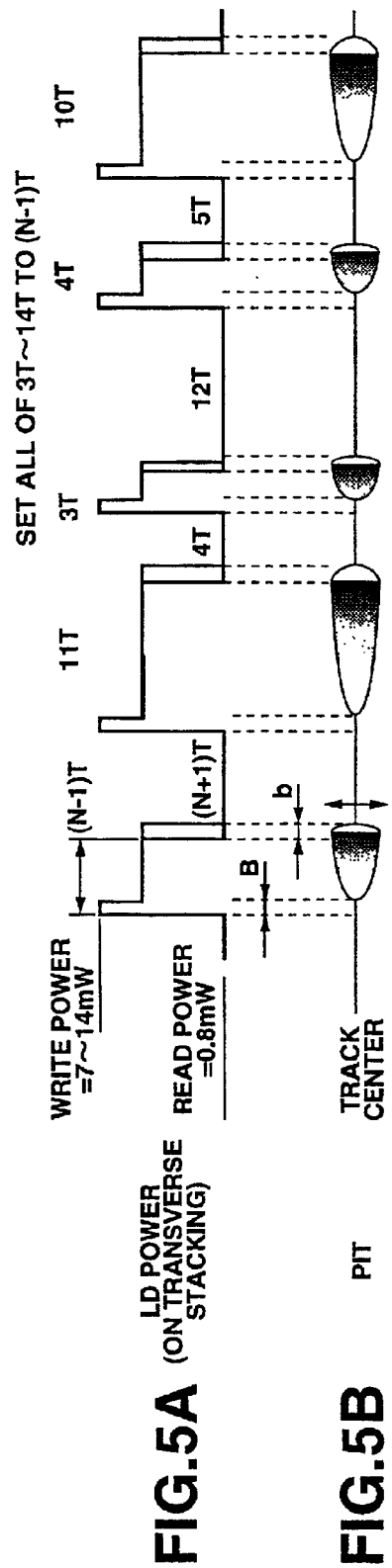
FIGS. 5A and 5B illustrate pit distortion in octupled speed recording using the recording strategy in quadrupled speed recording.

In FIG. 9, the time period C indicates the time delay since the turning on of the laser light emission until a pit starts to be formed, while the time period c indicates the time delay since the turning off of the laser light emission until the pit has been formed. The time periods C and c may be represented by $$C < B < A \text{ and}$$

$$c < b < a,$$

where the time periods A and a are time periods in case recording is made using the recording strategy for mono-tupled and double speed recording, as shown in FIG. 4, and the time periods B and b are the time periods in case recording is made using the recording strategy for quadrupled speed recording, as shown in FIG. 5. That is, the above time period C and c are shorter than the time periods A and a or B and b.

Thus, with the optical disc recording and/or reproducing apparatus 100 according to the present invention, pits/lands can be produced which are adapted more accurately to the EFM signals in high-speed recording.

In this optical disc recording and/or reproducing apparatus 100, in which the driving current i is generated by summing the ODP recording pulse V2 and ODP recording pulse V3 to the EQEFM recording pulse V1, the levels or the pulse widths of the pulses V1 to V3 are varied depending on the recording conditions, or on pulse widths of the EFM signals detected by the pit/land length detection circuit 51 or directly previous pit or land length, with the pulse length being optionally and independently set responsive to each of the durations of 3T to 11T.

In actuality, the pulse width or the pulse level is adjusted depending on such conditions as the disc material type (type of the dye film material), disc makers, recording linear velocity or optical properties of the optical head.

In particular, in view of difference in the thermal reaction caused by the difference in the type of the dye material, it is effective to check for the type of the disc loaded in recording or the disc producer to adjust the pulse width or level. It is similarly effective for the recording operation to adjust the pulse width or level after the start of the recording.

Of the cyanine-based or phthalocyanine-based disc, characteristics of the replay 3T pit/land jitter were measured, and the results shown in FIGS. 10 to 13 were obtained.

Figure 10:
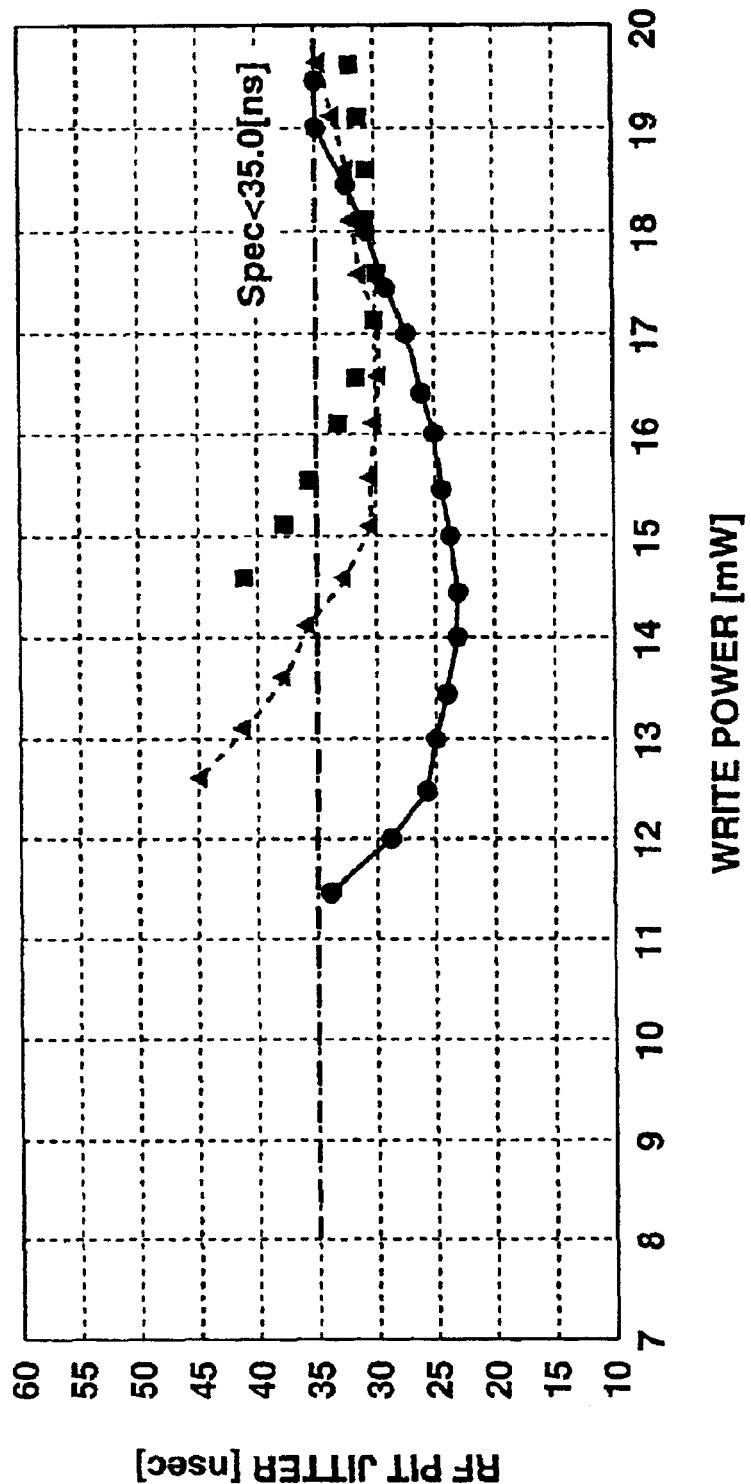
FIG. 10 is a graph showing measured results of replay 3T pit jitter characteristics obtained on octupled speed recording on a CD-R disc coated with a cyanine-based organic dyestuff.
Figure 11:
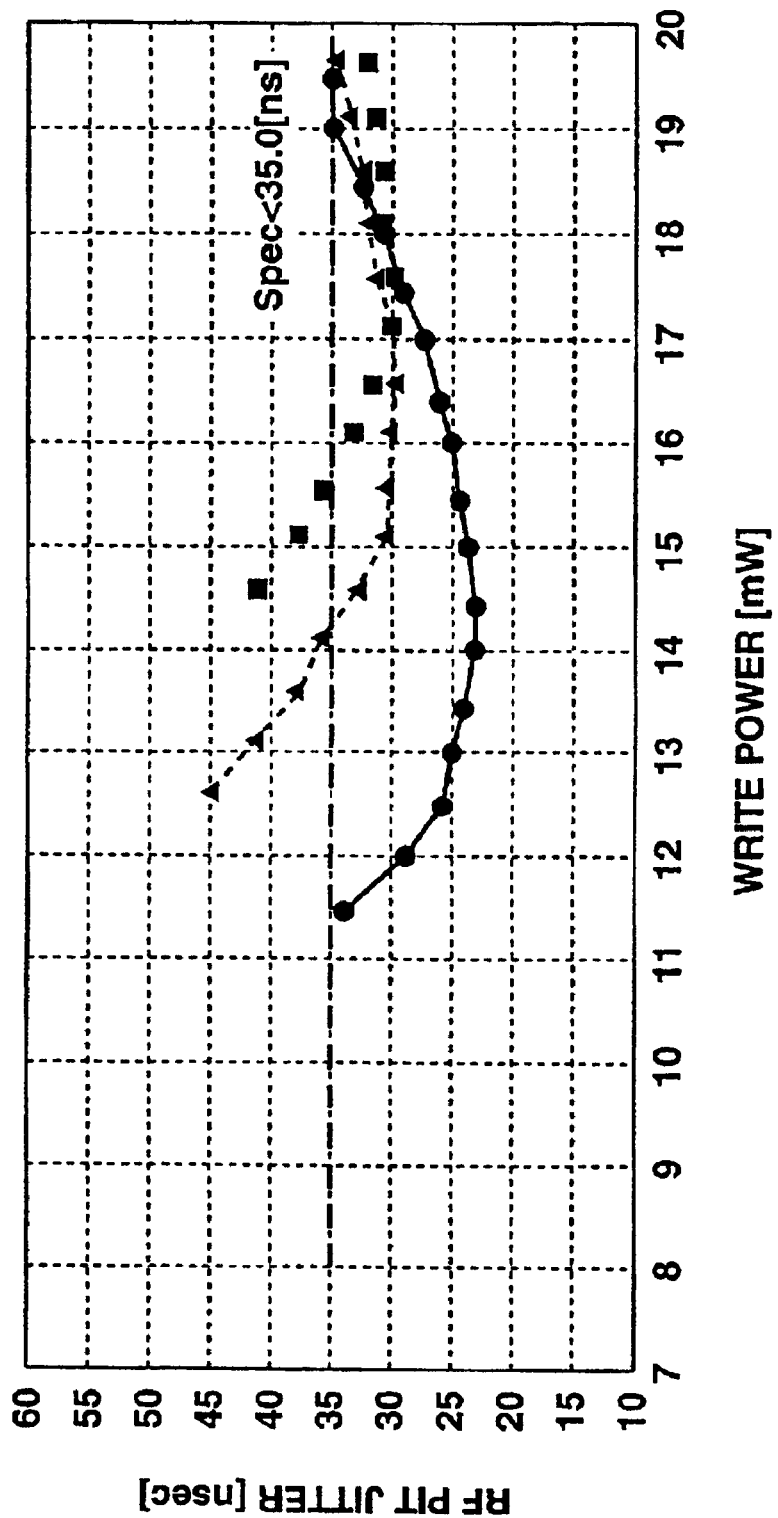
FIG. 11 is a graph showing measured results of replay 3T land jitter characteristics obtained on octupled speed recording on a CD-R disc coated with a cyanine-based organic dyestuff.
Figure 12:
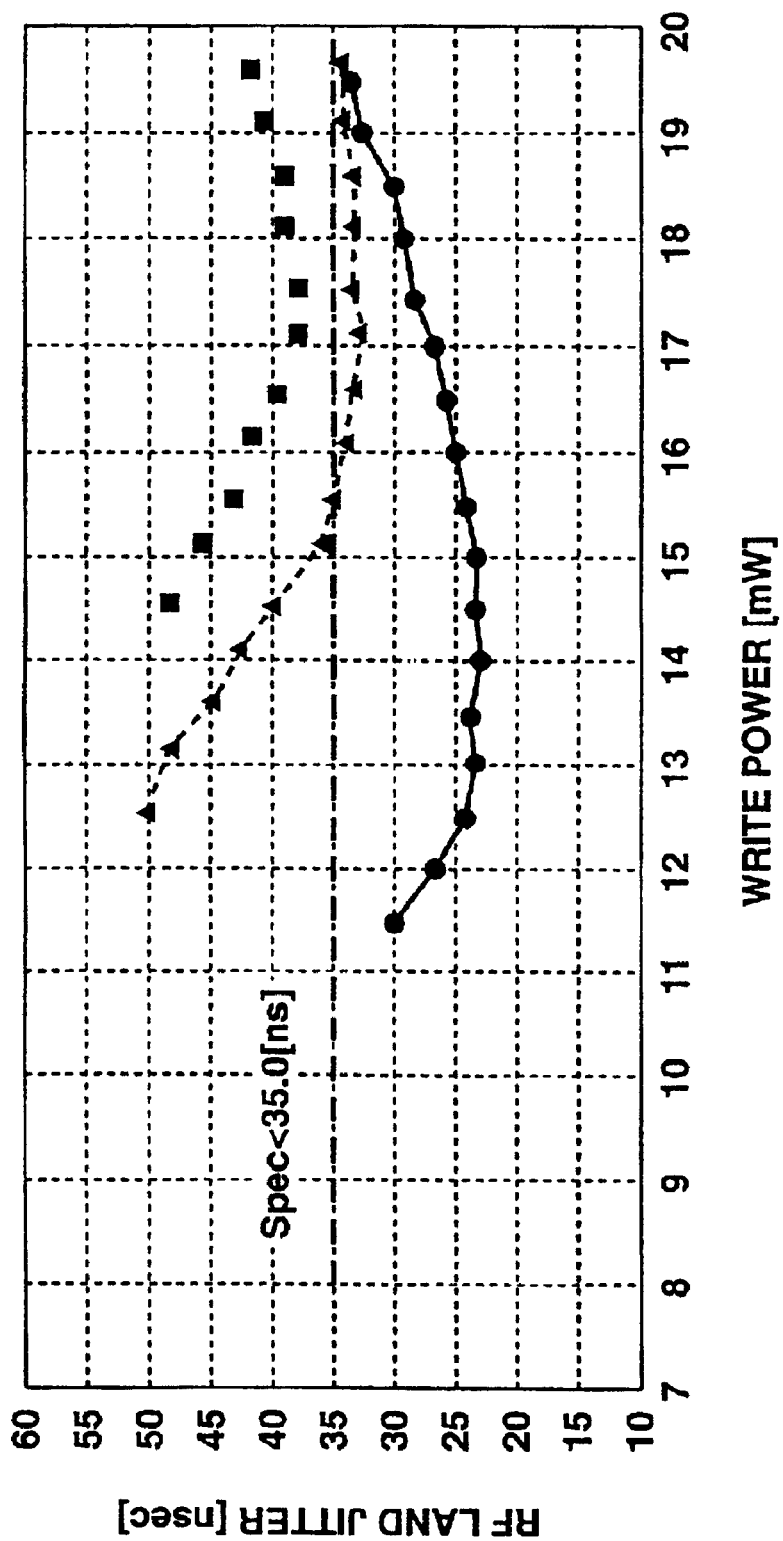
FIG. 12 is a graph showing measured results of replay 3T pit jitter characteristics obtained on octupled speed recording on a CD-R disc coated with a phthalocyanine-based organic dyestuff.
Figure 13:
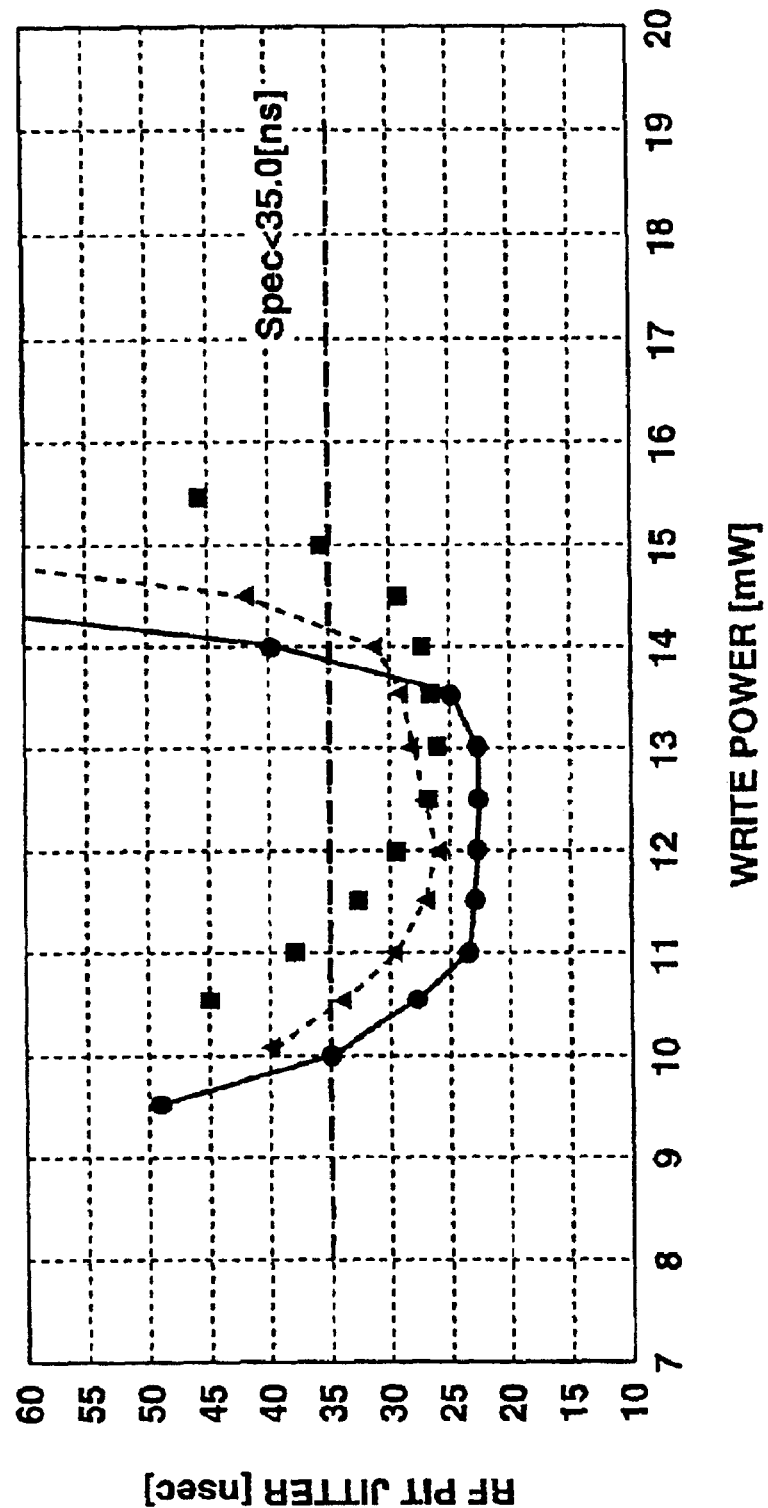
FIG. 13 is a graph showing measured results of replay 3T land jitter characteristics obtained on octupled speed recording on a CD-R disc coated with a phthalocyanine-based organic dyestuff.

FIGS. 10 and 11 show measured results of replay 3T pit jitter characteristics and replay 3T land jitter characteristics, obtained on octupled speed recording on a CD-R medium coated with the cyanine-based organic dye. FIGS. 12 and 13 show measured results of replay 3T pit jitter characteristics and replay 3T land jitter characteristics, obtained on octupled speed recording on a CD-R medium coated with the phthalocyanine-based organic dye. In FIGS. 10 to 13, the abscissa and the ordinate denote the recording power and the RF jitter contained in the replay RF signals.

Figure 2:
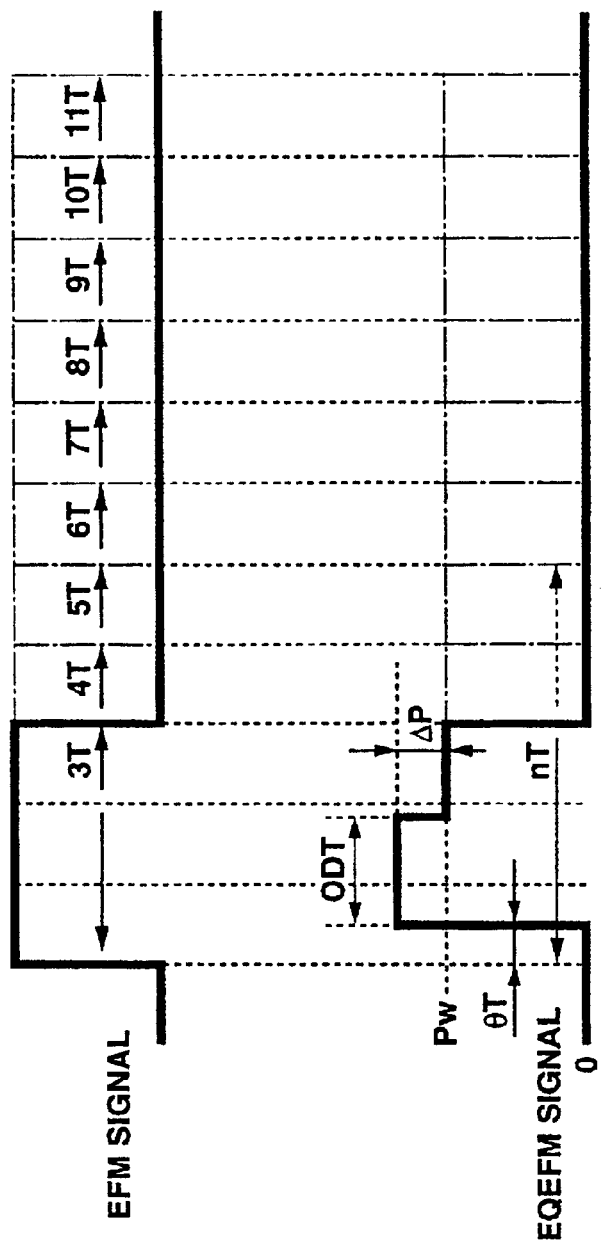
FIGS. 2A and 2B are waveform diagrams showing a recording strategy in quadrupled speed recording as prescribed in the Orange-Book standard.

In FIGS. 10 to 13, the measured results in case recording is effected for $\theta=0.25$, $\alpha=0.13T$, using the recording strategy for conventional mono-tupled and double speed recording shown in FIG. 1, those in case recording is effected for $\theta=0.25$, $\alpha=1.50T$ and $\Delta P=30\%$, using the recording strategy for conventional quadrupled speed recording shown in FIG. 2, and those in case recording is effected on the optical disc recording and/or reproducing apparatus 100 of the present invention with the optimized pulse lengths of the respective recording pulses, are indicated by ■, ▼ and ●, respectively.

As may be seen from the measured results of the replay 3T pit/land jitter characteristics, shown in FIGS. 10 to 13, the post-recording pit/land jitter is improved significantly, without regard to the type of the organic dye material or the recording medium used, whilst the lowering in the power margin of the jitter with respect to the recording power or in the recording power may be prohibited appreciably.

Figure 14:
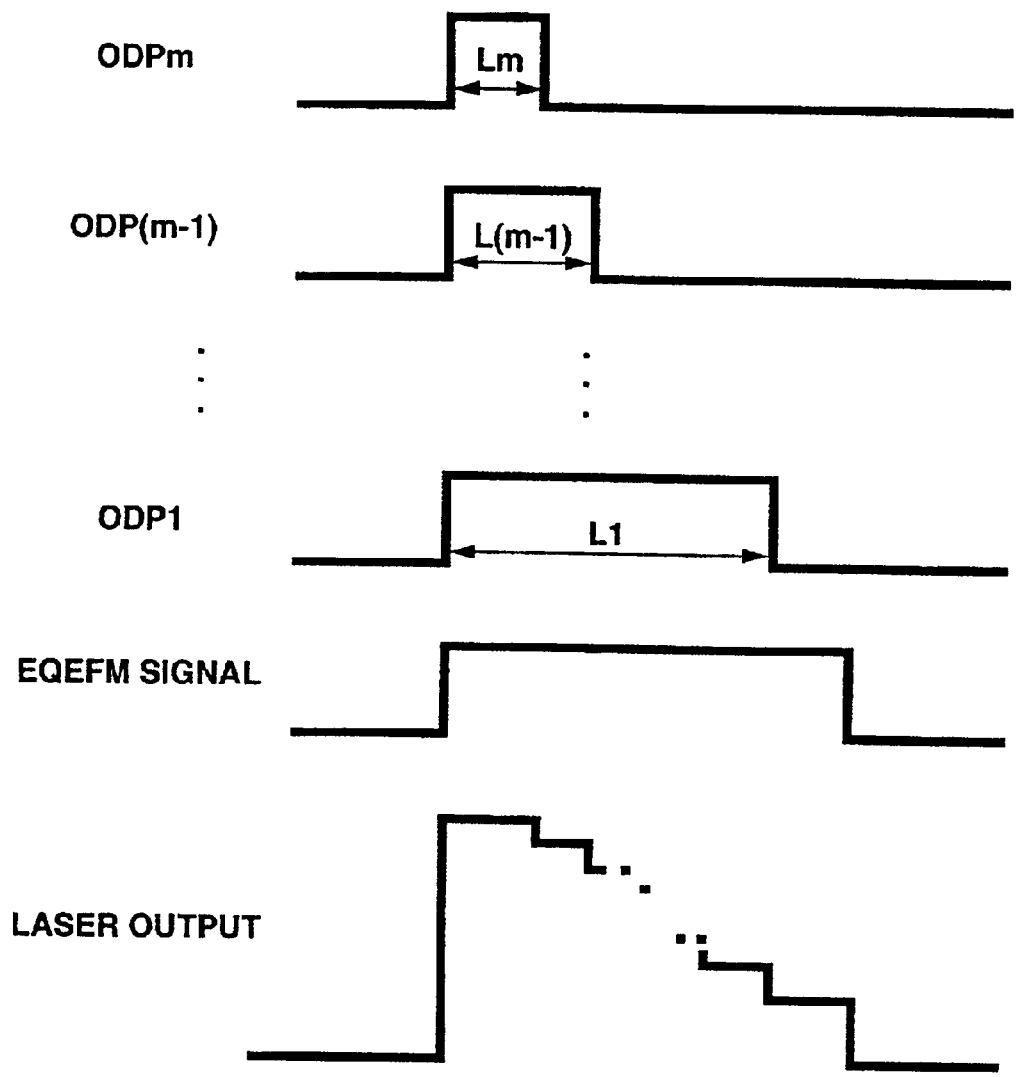
FIG. 14 is a waveform diagram showing a modification of a recording strategy as used in the optical disc recording and/or reproducing apparatus shown in FIG. 6.

In the above-described optical disc recording and/or reproducing apparatus 100, the recording laser light comprised of the EQEFM recording pulse V1, on approximately the leading edge of which $\Delta P1$ and $\Delta P2$ are stacked, is adapted to emit light. Alternatively, such a recording strategy may also be used in which the recording pulse generating circuit 5 generates the EQEFM recording pulse V1 and m sorts of ODP1 recording pulses, namely the ODP1 recording pulse V1 to ODPm recording pulse Vm, with pulse widths of L1 to Lm, to cause the recording laser of a waveform having the m-stage stacked portions $\Delta P1$ to $\Delta Pm$ at approximately the forward end of the EQEFM recording pulse V1 to emit light to effect recording, as shown in FIG. 14.

Figure 15:
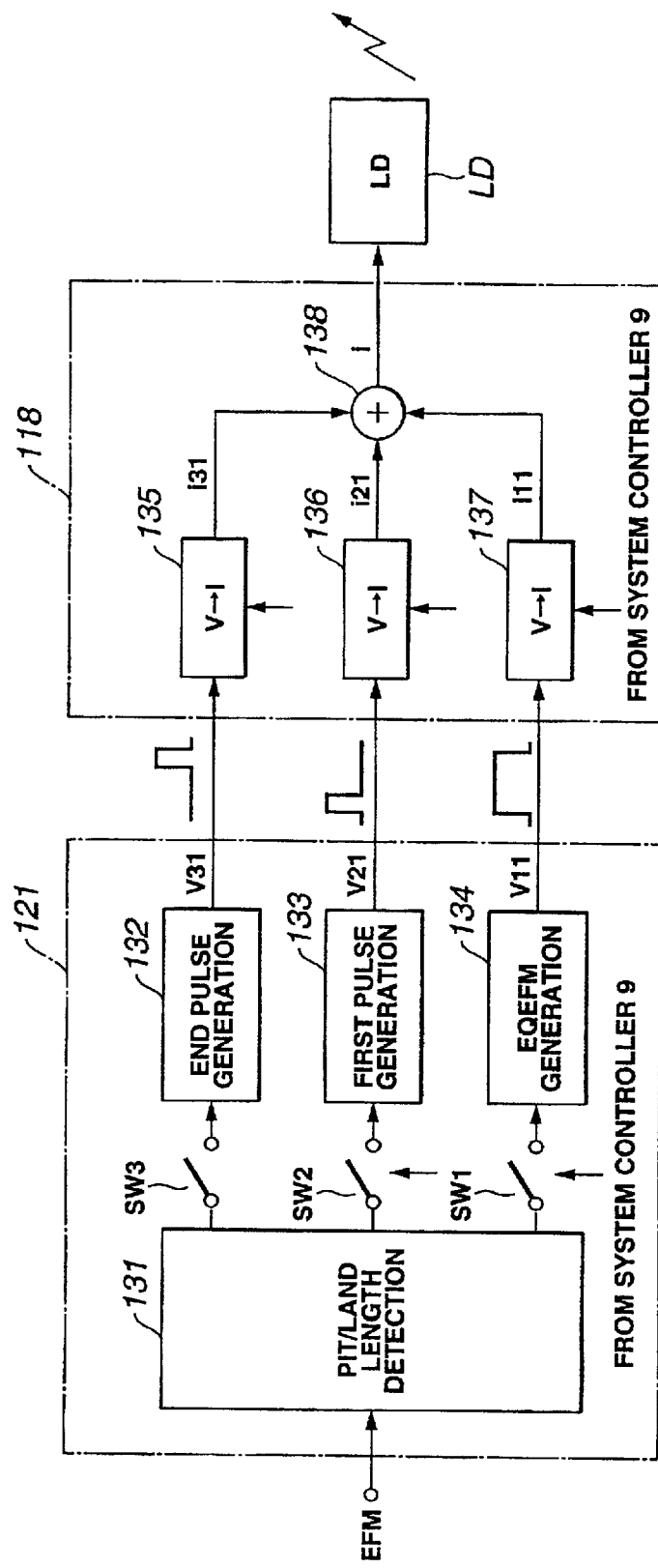
FIG. 15 is a block diagram of a recording laser power controlling system embodying the present invention.

The components of a modified embodiment of a disc drive device responsible for generating laser driving pulses at the time of recording are extracted and shown in FIG. 15. Meanwhile, the overall structure of the disc drive device is similar to that of the first embodiment shown in FIG. 1.

During recording, the EFM signals from the encoder/decoder circuit 7 are sent to a recording pulse generator 121 which is made up of a pit/land length detection circuit 131, an end pulse generating circuit 132, a first pulse generating circuit 133 and an EQEFM generating circuit 134.

The EQEFM generating circuit 134 generates an EQEFM signal V11 of a pre-set level and a pulse width derived from the EFM signal.

The first pulse generating circuit 133 generates a first over-drive pulse V21 to be added to approximately the leading end of a laser driving pulse.

The end pulse generating circuit 132 generates an end over-drive pulse V31 to be added to approximately the trailing end of the laser driving pulse.

The end pulse generating circuit 132, first pulse generating circuit 133 and the EQEFM generating circuit 134 generate respective pulses V11, V21 and V31 with pulse widths corresponding to the pulse width of the EFM signal. The pulse width or the pulse level (voltage level) is variably controlled depending on the current pulse width or the directly previous pit or land length of the EFM signal as detected by the pit/land length detection circuit.

The switches SW1, SW2 and SW3 are changeover circuits for enabling/disabling the EQEFM signal V11, first over-drive pulse V21 and the end over-drive pulse V31, and are controlled by the system controller 9. That is, the system controller 9 is responsive to the write command or the mode setting command sent from the host computer 10 to recognize with which multiple speed the recording data transferred from the host computer 10 is to be recorded on the disc. The system controller 9 changes over the switches SW1 to SW3 depending on the write speed as required. For example, if the write speed is the mono-tupled or double speed, the system controller 9 disables the first pulse generating circuit 133 and the end pulse generating circuit 132 by turning the switches SW2 and SW3 off so as to preclude the appendage of the first over-drive pulse V21 and the end over-drive pulse V31, as indicated by the drive pulse shown in FIG. 1. If the write speed as requested is the quadrupled speed, only the switch SW3 is turned off to preclude the outputting of the end over-drive pulse V31 as indicated by the drive pulse shown in FIG. 2. In recording the data at an octupled speed, as newly proposed in accordance with the present invention, all of the switches SW1, SW2 and SW3 are turned on to output a drive pulse as indicated in FIGS. 17 to 22.

The EQEFM signal V11, first over-drive pulse V21 and the end over-drive pulse V31 are converted respectively into current signals i11, i21 and i31 in the current/voltage converting circuits 137, 136, 135 in laser diver circuit 30.

In the addition circuit 138, the current signals i17, i27 and i37 are added to give the driving current i applied to the laser diode LD.

Meanwhile, in the present embodiment, control signals from the system controller 9 are input to the voltage/current converting circuits 137, 136, 135. That is, if the level (amplitude) of each pulse is to be changed depending on e.g., the rotational speed of the disc (linear speed relative to the track) during recording, length of the pit recorded, the material type of the recording layer (dye layer) used in the disc, or ambient temperature, control signals or parameters are input by the system controller 9. Thus, the level (amplitude) of the respective signals V11, V21, V31 is individually controlled by parameters applied to the voltage/current converting circuits 137, 136, 135. Although the voltage/current converting circuits 137, 136, 135 are provided in the present embodiment with the level adjustment function, it is also possible to provide a level adjustment circuit upstream or downstream of the voltage/current converting circuits 137, 136, 135 as a separate circuit.

The laser power controlled in the present stricture is as follows:

FIGS. 16C, 16D and 16E show specified examples of the end over-drive pulse (ODP END; V31), first over-drive pulse (ODP FIRST; V21) and EQEFM signal V11, respectively.

The laser power output by the driving current i, corresponding to the current values rendered from the signals V11, V21 and V31 and summed together, is as shown in FIG. 16A. That is, the power by the first over-drive pulse is summed to the leading end of the EQEFM signal, whilst the power by the end over-drive pulse is summed to the trailing end. It is noted that Pr, Pw and Pod are the replay laser level, recording laser level and the laser level by the over-drive pulse, respectively.

By the output laser power of the laser diode LD being controlled in this manner, a track by the pit P and the land L is formed on the disc 1, as shown in FIG. 16B.

Figure 16:
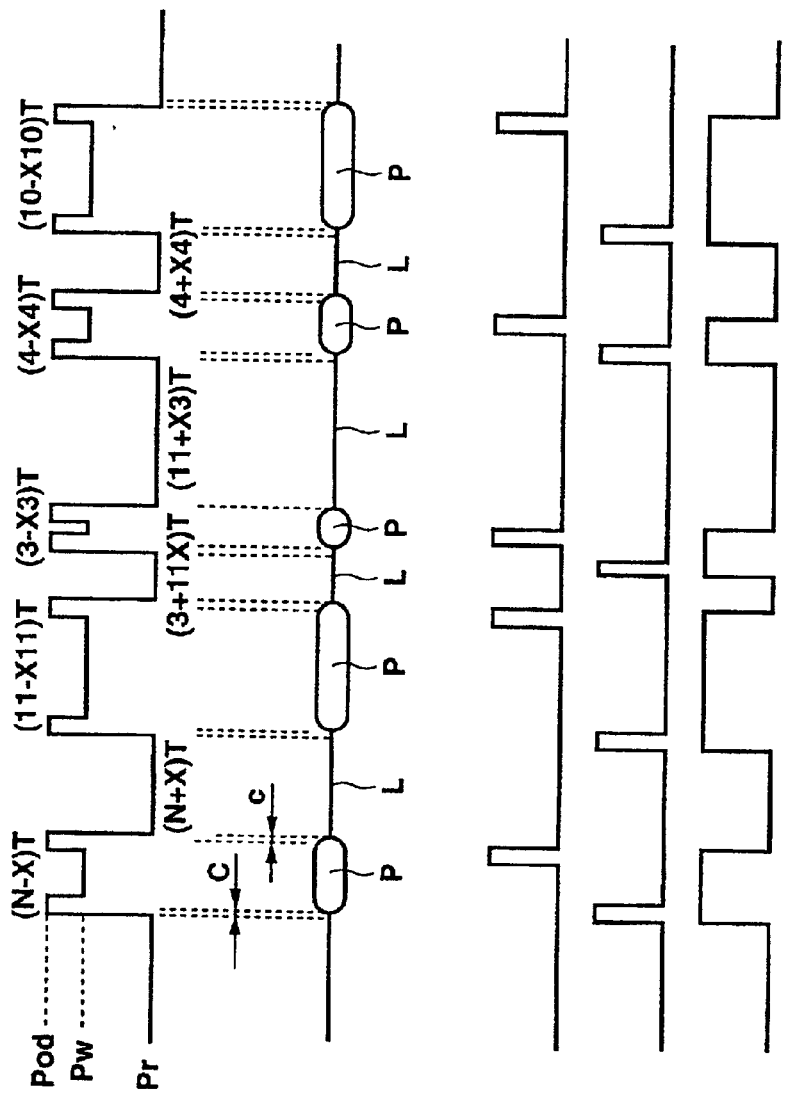
FIGS. 16A to 16E illustrate recording laser patterns and driving pulses embodying the present invention.

In FIG. 16, the time period C denotes the time delay as from the turning on of the laser light emission until the pit P starts to be formed, whilst the time period c denotes the time delay as from the turning off of the laser light emission until the end of forming of the pit P.

In the present embodiment, the end over-drive pulse and the first over-drive pulse are summed to the EQEFM signals to generate the driving signal i. The EQEFM signals, end over-drive pulse and the first over-drive pulse, generated by the recording signal generating unit 121, can be varied in level or pulse width depending on the pit or land length of the fore and aft side pits and lands as detected by the pit/land length detection circuit. The system controller 9 optionally variably sets the pulse width depending on the different pulses 3T to 11T.

That is, the pulse width is basically the pulse of (N−X (N))T pulse for the N(T) EFM pulse.

That is, the values X3 to X11 for setting the pulse widths of the EQEFM signal are optionally respectively set depending on the respective pulses of 3T to 11T.

Figure 3:
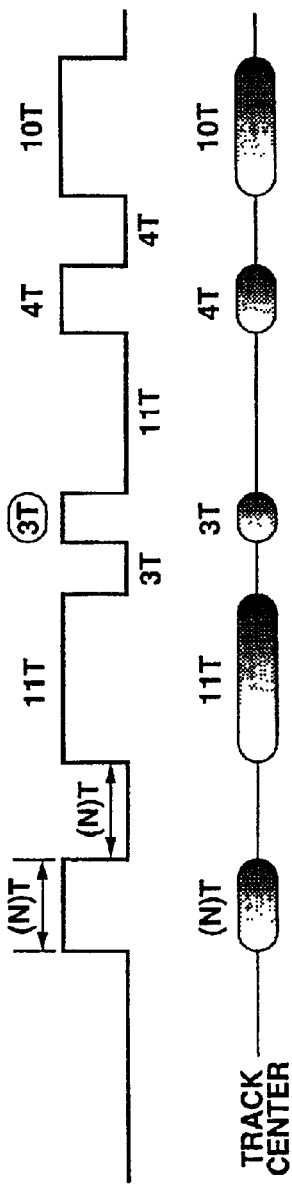
FIGS. 3A and 3B illustrate an ideal recording state.

For example, FIG. 16A is associated with the EFM signals of FIG. 3A, whereas EQEFM signal with the pulse width of (3−X3)T pulse width is generated during the 3T pulse period of the EFM signals. Also, during the 11T pulse period, the EQEFM signal with the pulse width of (11−X11)T is generated.

That is, the pulse width is controlled in accordance with the difference in the pulse width, that is the difference in the heat storage on the recording track caused by the difference in the laser illuminating time period, thus enabling the pits/lands suitably conforming to the EFM signals.

By way of an example, the values of X3 to X11 may take on the values of 0.25 to 0.2.

To the EQEFM signal are summed the first over-drive pulse and the end over-drive pulse. As the synthesized waveform pattern (laser output level control pattern), a variety of patterns as shown for example in FIGS. 17 to 22 may be used. In FIGS. 17 to 22, L1 and L2 denote pulse widths of the first over-drive pulse an the end over-drive pulse, respectively.

Figure 17:
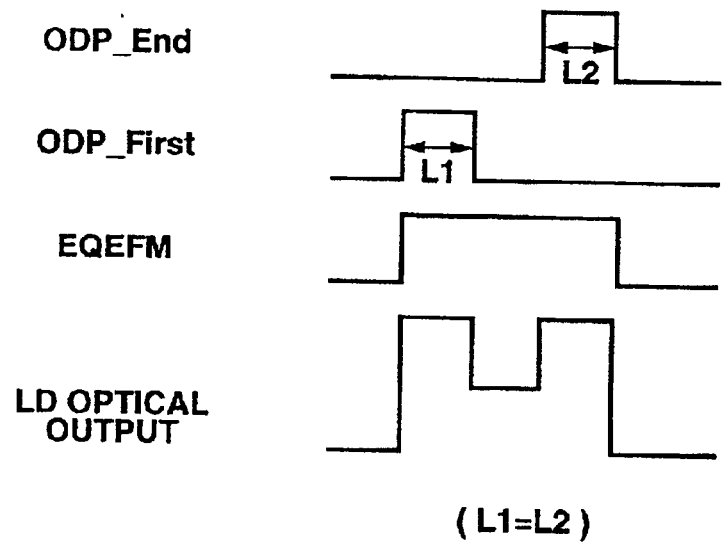
FIGS. 17 to 22 illustrate typical recording laser patterns embodying the present invention.

FIG. 17 shows a case in which L1=L2 and in which the rising of the first over-drive pulse and the decay of the EQEFM signal are synchronized with the EQEFM signal.

Figure 18:
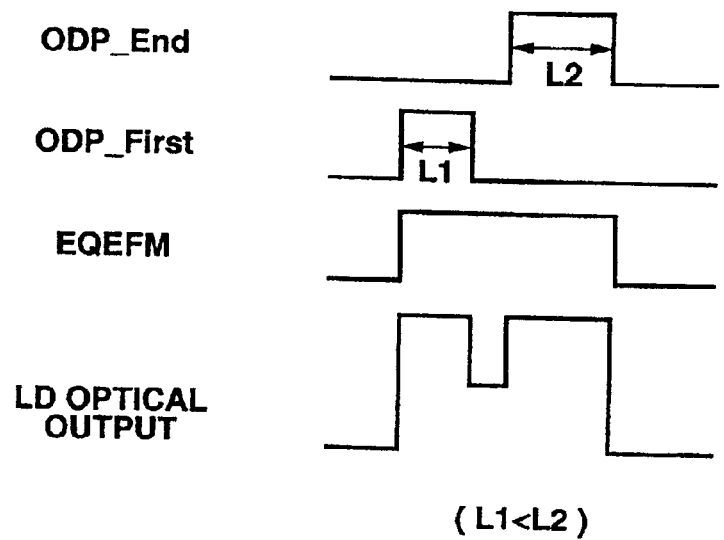

FIG. 18 shows a case in which L1<L2 and in which the rising of the first over-drive pulse and the decay of the EQEFM signal are synchronized with the EQEFM signal.

Figure 19:
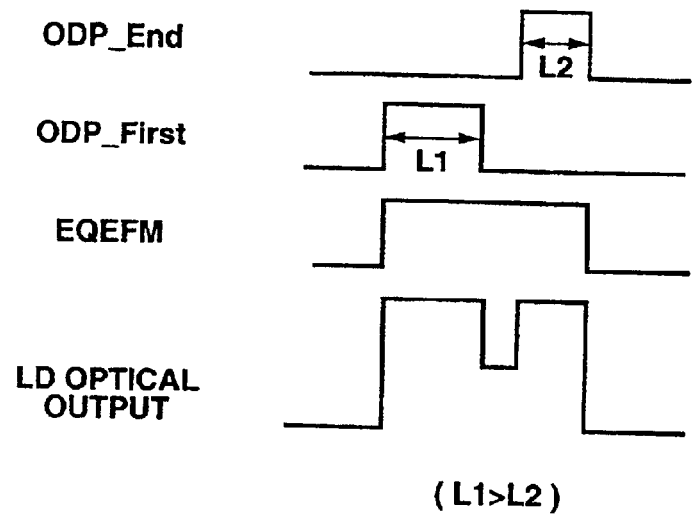

FIG. 19 shows a case in which L1>L2 and in which the rising of the first over-drive pulse and the decay of the EQEFM signal are synchronized with the EQEFM signal.

Figure 20:
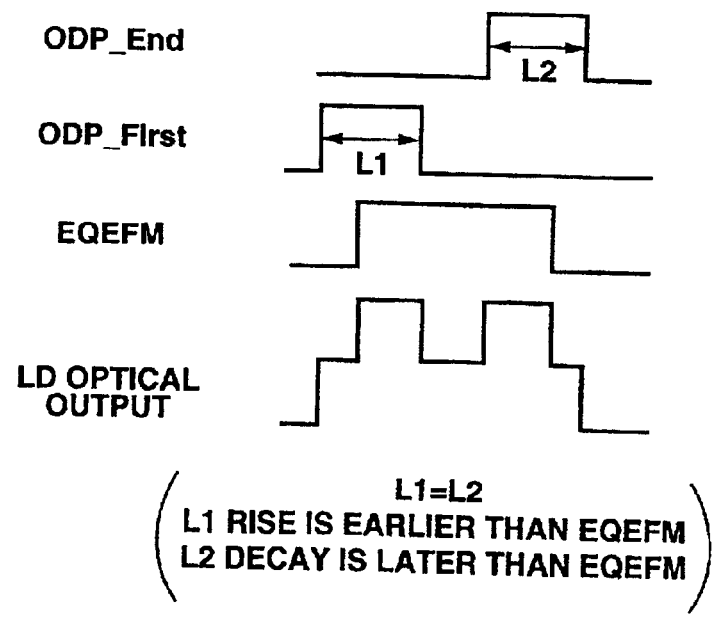

FIG. 20 shows a case in which L1=L2 and in which the rising of the first over-drive pulse is earlier than the EQEFM signal and the decay of the end over-drive pulse is later than the EQEFM signal.

Figure 21:
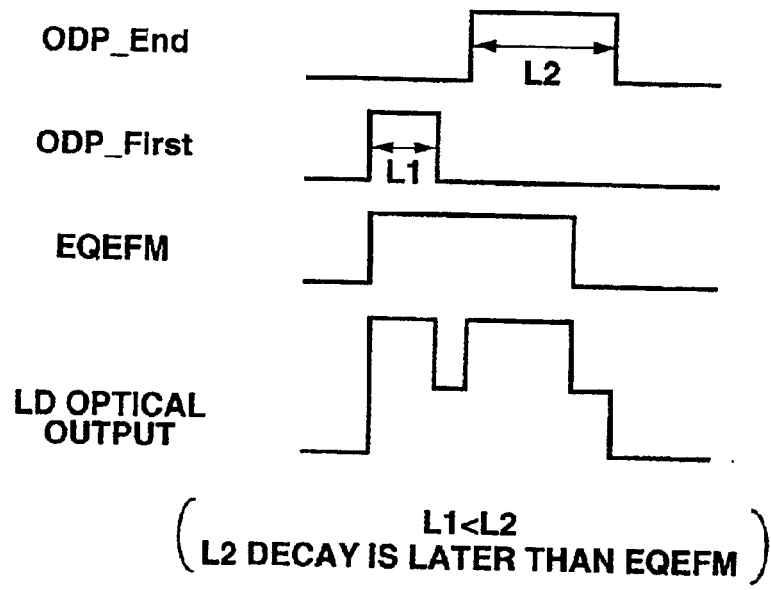

FIG. 21 shows a case in which L1<L2 and in which the rising of the first over-drive pulse is synchronized with the EQEFM signal and the decay of the end over-drive pulse is later than the EQEFM signal.

Figure 22:
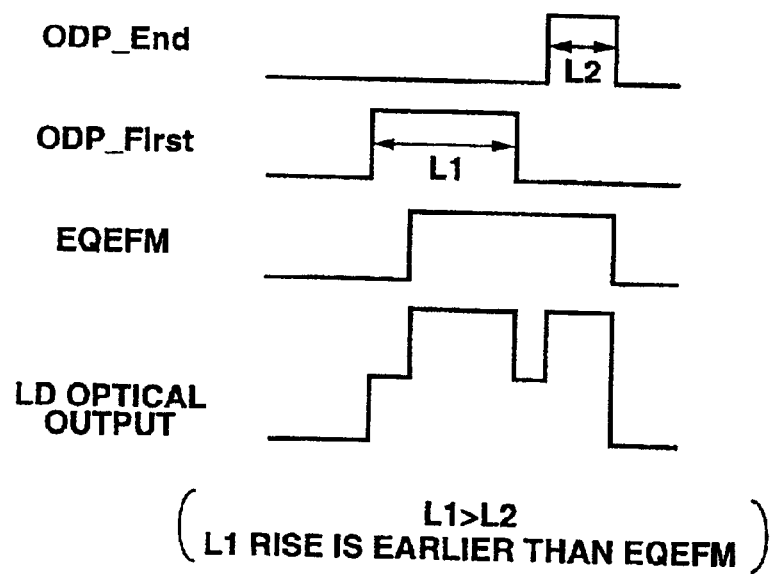

FIG. 22 shows a case in which L1>L2 and in which the rising of the first over-drive pulse is earlier than the EQEFM signal and the decay of the end over-drive pulse is synchronized with the EQEFM signal.

In all of these figures, it is possible to realize a laser light emission pattern as indicated as an LD light output.

Other patterns than these may, of course, be realized.

The respective patterns may be selectively used, in particular the time periods L1 and L2 may be set, depending on the pit and land lengths directly before and after detection by the pit/land length detection circuit. For example, if the directly previous land domain is longer, the time period L1 is longer, whereas, if the directly previous land domain is shorter, the time period L1 is shorter.

That is, the laser driving pattern is controlled depending on variations in the heat storage caused by different pit/land lengths.

The lengths of the time periods L1 and L2 are variable in a range from 0T to 3T.

Although not shown, the levels (voltage values) of the end over-drive pulse and the first over-drive pulse may be varied depending on the lengths of the fore and aft side pit and land, as in L1 and L2 above.

That is, the heat quantity stored in the disc 1 is determined on the basis of both the laser light volume and the time period, such that optimum laser drive pattern may be set depending on the variations of the heat storage quantity by the pit length/land length.

For example, the level Pod in FIG. 16 is changed between e.g., a 20%-up value, 25%-up value and a 30%-up value of the recording laser power Pw.

So, when a CD-R as the disc 1 is run in rotation at an octupled speed for data recording, the parameters given in generating the respective pulses are hereinafter explained, taking a waveform pattern shown in FIG. 19 as an example.

With the EQEFM signal having a pulse width of (N 0.25)T, the first over-drive pulse and the end over-drive pulse, added to the EQEFM signal, are of pulse widths L1 and L2 equal to 1.75T and 1T, respectively, if the length of the lands formed directly ahead and at back is 8T. These pulses are of a level (amplitude) larger by approximately 30% than the level of the EQEFM signal. Meanwhile, the pulse width of the first over-drive pulse is varied, as the system controller 9 sets parameters for the recording signal generator 121, depending on the length of the pit to be recorded (3T to 11T) or the length of the land (3T to 11T) formed directly before and after the pit. That is, there are a sum total of 729 parameters corresponding to different combinations of nine directly previous land lengths, nine recording pit lengths and nine directly following land lengths. For example, L1=1.75T is set to 1.05T and to 0.35T if the recording pit length is 4T and in a range of 5T to 11T, respectively. In addition, 0.2T to +0.2T is added to these values depending on the directly previous land lengths. For example, if L1=1.75T is a reference value L1 is set to a value from 1.55T to 1.95T.

In actuality, the pulse width and the pulse level are also adjusted depending on the type of the disc material (that of the dye film material), disc producer, recording linear speed, recording speed or characteristics of the optical system of the optical pickup 1.

Moreover, since the difference in the thermal reaction is caused by e.g., the difference in the type of the dye film material, it is effective to discriminate the sort of the disc loaded or the maker at the time of recording to adjust the pulse width or the pulse level. The execution environment during recording, such as the recording linear speed or the recording speed, may be transmitted by e.g., the system controller 9 to the recording pulse generator 121 to adjust the pulse width or the pulse level for optimal recording.

Thus, by controlling the laser light emission by the driving current i corresponding to the sum of the EQEFM signal to the end over-drive pulse and to the first over-drive pulse as shown in FIG. 16A, by varying the level or the pulse width of the EQEFM signal, end over-drive pulse and the first over-drive pulse in the recording pulse generator 121 depending on recording conditions or on the lengths of fore and aft side pits and lands and by optionally variably setting the pulse width depending on different durations of 3T to 11T. The first and second embodiments of the present invention may also be applied in combination.

What is claimed is:

1. An optical disc recording apparatus comprising:
    recording pulse generating means for setting a recording power at approximately the leading end portion of a recording pulse in steps of a plurality of stages and for generating a recording pulse of a pulse width corresponding to a length of a pit to be formed, said recording pulse generating means includes:
        a first pulse generation circuit configured to generate a first pulse,
        a second pulse generation circuit configured to generate a second pulse, and
        a third pulse generation circuit configured to generate a third pulse; wherein
    said recording pulse generating means includes a pulse combining mechanism configured to combine said first pulse, said second pulse, and said third pulse to form said recording pulse; and
    laser means for illuminating laser light based on the recording pulse supplied to form a recording data string comprised of pits and lands on a recording medium;
    wherein said laser light based on the recording pulse generated by said recording pulse generating means is illuminated on a write-once optical disc as said recording medium to effect recording; and
    said first pulse corresponds to recording data, said second pulse is synthesized a predetermined time after a leading end of said first pulse and said third pulse is synthesized another predetermined time before a trailing end of said first pulse, said third pulse being of a pulse width smaller than said second pulse.

2. The optical disc recording apparatus according to claim 1 wherein:
    said recording pulse generating means varies the pulse width and/or the pulse level of one or more of said first to third pulses, depending on recording conditions, to generate said recording pulse.

3. The optical disc recording apparatus according to claim 1 wherein:
    said recording pulse generating means includes pit/land length detection means for detecting the length of the pit/land to be formed and varies the pulse width and/or the pulse level of one or more of said first to third pulses, depending on the combinations of the lengths of the pits/lands to be formed, based on a detection output by said pit/land length detection means, to generate a recording pulse.

4. The optical disc recording apparatus according to claim 1 wherein:
    said recording pulse generating means varies the pulse width and/or the pulse level of one or more of said first to third pulses, depending on conditions of an optical disc for recording, to generate the recording pulse of a pulse width.

5. The optical disc recording apparatus according to claim 3 wherein:
    said recording pulse generating means variably sets the pulse width of one or more of said first to third pulses responsive to at least one of the length of the pit formed directly previously and the length of the land formed directly previously.

6. The optical disc recording apparatus according to claim 3 wherein:
    said recording pulse generating means varies the pulse width of said first pulse depending on the length of a land formed directly ahead of a pit formed.

7. The optical disc recording apparatus according to claim 6 wherein:
    said recording pulse generating means varies the pulse width of said first pulse depending on the length of a pit formed.

8. The optical disc recording apparatus according to claim 6 wherein:
    said recording pulse generating means varies the pulse width of said first pulse depending on the length of a land formed directly at back of a pit formed.

9. An optical disc recording apparatus comprising:
    recording pulse generating means for setting a recording power at approximately the leading end portion of a recording pulse in steps of a plurality of stages and for generating a recording pulse of a pulse width corresponding to a length of a nit to be formed, said recording pulse generating means includes:
        a first pulse generation circuit configured to generate a first pulse,
        a second pulse generation circuit configured to generate a second pulse, and
        a third pulse generation circuit configured to generate a third pulse; wherein
    said recording pulse generating means includes a pulse combining mechanism configured to combine said first pulse, said second pulse, and said third pulse to form said recording pulse;
    laser means for illuminating laser light based on the recording pulse supplied to form a recording data string comprised of pits and lands on a recording medium; and changeover means for switching the operation of said recording pulse generating means to preclude outputting of at least one of said first to third pulses generated by said recording pulse generating means, said recording pulse generating means performing switching control of said changeover means in association with a speed of forming a recording data string on said recording medium;

wherein said laser light based on the recording pulse generated by said recording pulse generating means is illuminated on a write-once optical disc as said recording medium to effect recording.

10. The optical disc recording apparatus according to claim 9 wherein:

said recording pulse generating means controls said changeover means so that, if said optical disc is rotated at a linear speed not higher than a speed four times a reference speed, said third pulse is not output.

11. A recording method for an optical disc comprising steps of:

generating a first pulse with a first pulse generation circuit, a second pulse with a second pulse generation circuit, and a third pulse with a third pulse generating circuit;

combining said first pulse, said second pulse, and said third pulse to form a recording pulse having a pulse width corresponding to a length of a pit formed, said recording pulse being so formed that a recording power at approximately the forward end thereof is stepped over plural stages; and illuminating a laser light beam, excited in pulsed light by said recording pulse, on a write-once optical disc to effect recording;

wherein said first pulse corresponds to recording data, said second pulse is synthesized a predetermined time after a leading end of said first pulse and said third pulse is synthesized another predetermined time before a trailing end of said first pulse, and said third pulse is generated with a pulse width smaller than said second pulse.

12. The recording method for an optical disc according to claim 11 wherein:

recording is performed as the pulse width and/or the pulse level of one or more of said first to third pulses is controlled depending on a recording condition.

13. The recording method for an optical disc according to claim 11 wherein:

recording is performed as the pulse width and/or the pulse level of one or more of said first to third pulses is controlled depending on different combinations of the lengths of the pits/lands formed.

14. The recording method for an optical disc according to claim 11 wherein:

recording is performed as the pulse width and/or the pulse level of one or more of said first to third pulses is varied depending on the condition of the optical disc to effect recording.

* * * * *

UNITED STATES PATENT AND TRADEMARK OFFICE
CERTIFICATE OF CORRECTION

PATENT NO. : 6,819,644 B2
DATED : November 16, 2004
INVENTOR(S) : Takashi Sasaki et al.

It is certified that error appears in the above-identified patent and that said Letters Patent is hereby corrected as shown below:

Column 6,
Line 33, change "ID" to -- LD --.

Column 11,
Line 14, change "preducer" to -- producer --.

Column 12,
Line 51, change "nit" to -- pit --.

Signed and Sealed this

Seventeenth Day of May, 2005

JON W. DUDAS
*Director of the United States Patent and Trademark Office*